United States Patent
Kahn et al.

(10) Patent No.: US 9,032,084 B2
(45) Date of Patent: *May 12, 2015

(54) METHOD AND SYSTEM FOR USING A WEBSITE TO PERFORM A REMOTE ACTION ON A SET TOP BOX WITH A SECURE AUTHORIZATION

(71) Applicant: The DIRECTV Group, Inc., El Segundo, CA (US)

(72) Inventors: Raynold M. Kahn, Los Angeles, CA (US); Deanna R. Kidd, Long Beach, CA (US); Hanno Basse, Santa Monica, CA (US); Tokunbo Labisi, Harbor City, CA (US); Frank A. Palase, Coto De Caza, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,890

(22) Filed: Jan. 9, 2013

(65) Prior Publication Data

US 2013/0125176 A1  May 16, 2013

Related U.S. Application Data

(63) Continuation of application No. 11/786,136, filed on Apr. 11, 2007, now Pat. No. 8,364,778.

(51) Int. Cl.
| | |
|---|---|
| G06F 15/16 | (2006.01) |
| H04N 21/61 | (2011.01) |
| H04N 7/173 | (2011.01) |
| H04N 21/266 | (2011.01) |
| H04N 21/4147 | (2011.01) |
| H04N 21/433 | (2011.01) |
| H04N 21/462 | (2011.01) |
| H04N 21/472 | (2011.01) |

(52) U.S. Cl.
CPC ....... *H04N 21/6143* (2013.01); *H04N 7/17318* (2013.01); *H04N 21/26613* (2013.01); *H04N 21/4147* (2013.01); *H04N 21/4334* (2013.01); *H04N 21/4622* (2013.01); *H04N 21/472* (2013.01)

(58) Field of Classification Search
CPC .................... H04N 7/17318; H04N 21/47202; H04N 21/6125; H04N 21/4147; H04N 21/632; H04N 21/43615; H04N 21/472; H04L 63/0428; H04L 2463/101
USPC ............ 709/203, 217, 231, 208, 219; 348/13, 348/10, 17, 46–47; 725/55, 100, 131, 39, 725/51; 379/102.01–102.05
See application file for complete search history.

(56) References Cited

U.S. PATENT DOCUMENTS

| | | | |
|---|---|---|---|
| 6,301,618 B1 * | 10/2001 | Sitaraman et al. ............ | 709/227 |
| 6,658,661 B1 | 12/2003 | Arsenault et al. | |
| 7,036,142 B1 * | 4/2006 | Zhang et al. ..................... | 726/12 |
| 7,624,429 B2 * | 11/2009 | Van Ackere et al. .............. | 726/3 |
| 7,818,368 B2 | 10/2010 | Yang et al. | |

(Continued)

*Primary Examiner* — Wing F Chan
*Assistant Examiner* — Benjamin M Thieu

(57) ABSTRACT

A conditional access system generating a permission packet in response to the content request. The permission packet has information for a user device to access content through a connection of a content delivery network so that in response to the permission packet, a first connection from the content delivery network to the user device may be opened by the user device.

39 Claims, 4 Drawing Sheets

(56) References Cited

U.S. PATENT DOCUMENTS

| | | | |
|---|---|---|---|
| 8,621,540 B2* | 12/2013 | Apsangi et al. | 725/116 |
| 2002/0061021 A1* | 5/2002 | Dillon | 370/390 |
| 2002/0151327 A1 | 10/2002 | Levitt | |
| 2002/0170072 A1* | 11/2002 | Lundbald et al. | 725/131 |
| 2003/0005446 A1* | 1/2003 | Jaff et al. | 725/51 |
| 2003/0023504 A1 | 1/2003 | Berenson et al. | |
| 2004/0237100 A1 | 11/2004 | Pinder et al. | |
| 2004/0261136 A1 | 12/2004 | Aratani et al. | |
| 2005/0028208 A1* | 2/2005 | Ellis et al. | 725/58 |
| 2005/0055716 A1* | 3/2005 | Louie et al. | 725/58 |
| 2005/0138654 A1* | 6/2005 | Minne | 725/31 |
| 2005/0154795 A1* | 7/2005 | Kuz et al. | 709/227 |
| 2005/0210500 A1* | 9/2005 | Stone | 725/31 |
| 2005/0262537 A1 | 11/2005 | Baran et al. | |
| 2006/0037041 A1* | 2/2006 | Zhang | 725/32 |
| 2006/0107285 A1* | 5/2006 | Medvinsky | 725/25 |
| 2006/0171390 A1* | 8/2006 | La Joie | 370/390 |
| 2006/0271950 A1 | 11/2006 | Kim et al. | |
| 2007/0107019 A1* | 5/2007 | Romano et al. | 725/80 |
| 2008/0075285 A1 | 3/2008 | Poli et al. | |
| 2008/0209491 A1* | 8/2008 | Hasek | 725/114 |
| 2009/0254974 A1* | 10/2009 | McGregor et al. | 726/3 |

* cited by examiner

METHOD AND SYSTEM FOR USING A WEBSITE TO PERFORM A REMOTE ACTION ON A SET TOP BOX WITH A SECURE AUTHORIZATION

CROSS-REFERENCE TO RELATED APPLICATIONS

This application is a continuation of U.S. patent application Ser. No. 11/786,136 filed on Apr. 11, 2007. The disclosure of the above application is incorporated herein by reference.

TECHNICAL FIELD

The present disclosure relates to a content delivery system and, more specifically, to a system that includes website that performs a remote action on a set top box.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resource.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

In some instances a subscriber may be away from his home, set top box, or other user device, but may desire certain content be stored on the device for viewing or use when he returns.

SUMMARY

The present invention allows content or a remote action to be commanded from a website so that content may be downloaded from a content source and stored in the memory of a set top box or other device. Authorizations may be obtained through many types of communication means including through a satellite.

In one aspect of the disclosure, a method of delivering content includes generating a permission packet at a conditional access system for accessing content from a content delivery network corresponding to a content title, communicating the permission packet from the conditional access system to a user device, and the user devices, opening a connection to the content delivery network for communicating content corresponding to the content title to the user device through the content delivery network based on the permission packet.

In still a further aspect of this disclosure, a communication system includes a conditional access system generating a permission packet in response to the content request. The permission packet has information for a user device to access content through a connection of a content delivery network so that in response to the permission packet, a first connection from the content delivery network to the user device may be opened by the user device.

To enhance security in the system, some embodiments may include a satellite connection conveying the conditional access packets while other communication means may be used to transmit the content.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
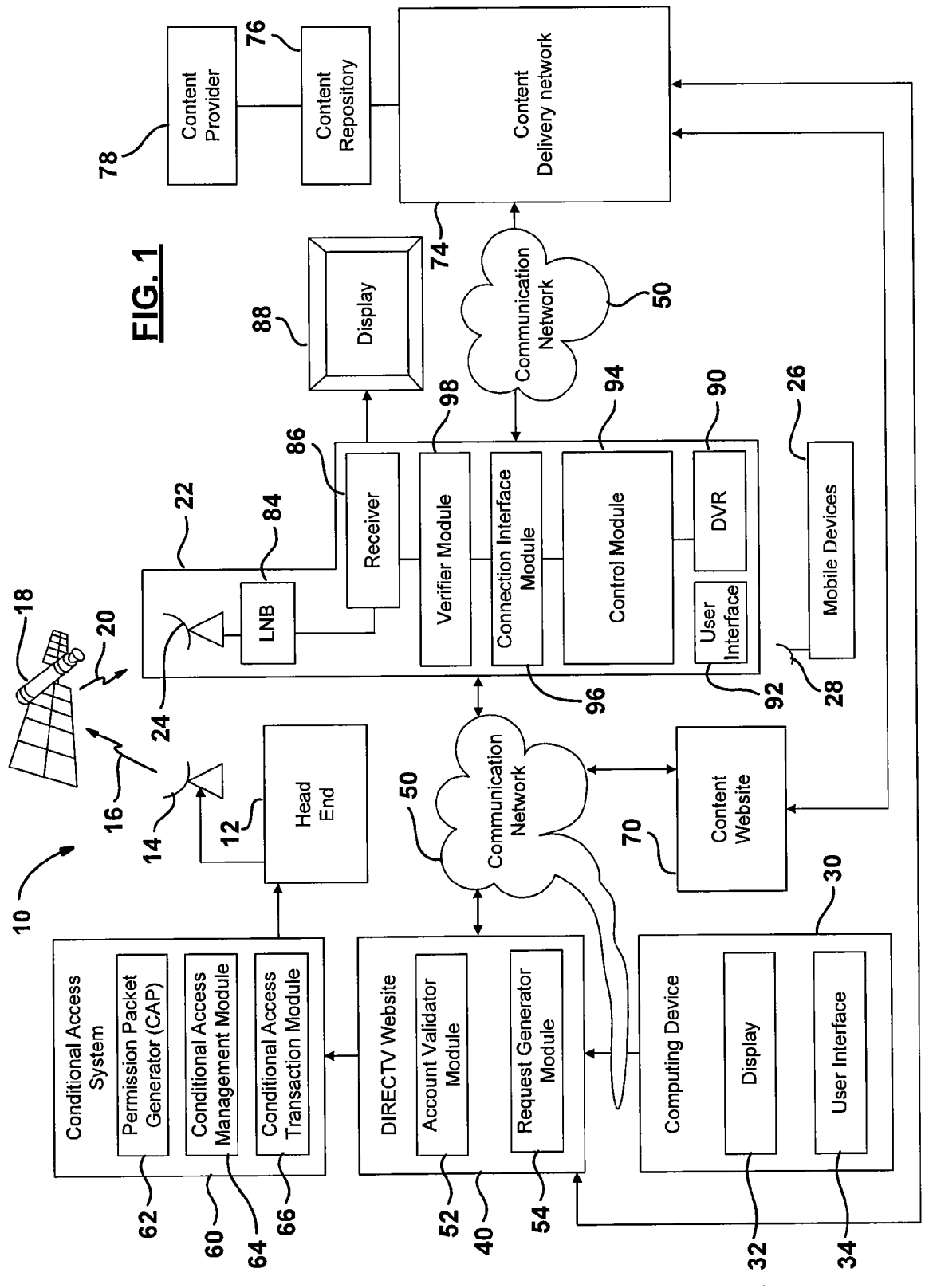
FIG. 1 is a schematic illustration of a content delivery system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

As illustrated in FIG. 1, a communication system 10 includes a head end 12 that is coupled to an uplink antenna 14. The head end 12 may be used for many things, including multiplexing, modulating and uplink signals 16 to satellite 18. It should be noted that satellite 18 may comprise a number of satellites in a system. The satellite 18 is used to generate downlink signals 20 to a user device 22, and, more specifically, to an antenna 24 of the user device 22. The user device 22 may include a set top box as illustrated. A user device may also include a mobile device 26 having a receiving antenna 28. The user device 22 may also be referred to as a set top box, a satellite set top box, or an integrated receiver decoder. The mobile device 26 may include an automobile base device, a laptop, a cell phone, a personal digital assistant, a portable media player, or the like. The wireless communications between the head end 12 and the users 22 may take place at any suitable frequency such as Ka band and/or Ku band frequencies.

Various types of content, security information, encryption-decryption information, digital rights management information, conditional access packets (CAPs) may be communicated through the communication system 10. It should also be noted that various content may be encrypted based upon a control word (CW) known to the head end 12 and known to the various user devices authorized to view and/or play back the content. The control word packets (CWPs) may include, among other things, a time stamp, authorization requirements and an input value for generating the control word.

To receive requested content, a PC or other Internet-connecting or computing device 30 may be used by a communication system user to make a selection, request for content to be communicated to the user device 22, or other request. The computing devices may include, but are not limited to, a cellular phone, a smart phone, a personal digital assistant, a laptop computer, a portable media player, or the like. The computing device 30 may include a display 32 and a user interface such as a keyboard or touch screen 34. The computing device 30 communicates with a website 40 through a communication network 50. The communication network 50 may include various types of communication, including a telephone-type communication link, an Internet-type communication link, a fiber optic communication link, a wired terrestrial communication link, a wireless or cellular link, or the like.

The website 40 may include various modules, including an account validator module 52 and a request generator module 54. The account validator module 52 validates the user's account by various means including, through the user of a password, an account number, or other security information used to verify the identity of the user. The account module validator 52 may be used when the user, through the computing device 30, logs into the website. A list of content available on the system may be provided to and displayed on the display 32 of the computing device 30. From this list, the user may select content to be stored within a digital video recorder (DVR) of the user device 22. The content may be transmitted to the user device 22 via satellite or broadband connection, or the content may received from an existing satellite broadcast program schedule.

The request generator module 54 may generate a request for a remote action. The remote action may include the transfer of content to the user device 22 and/or the opening of an Internet or other type of communication network connection between the user device and a source of content.

The conditional access system 60 receives the request from the request generator module 54. The conditional access system 60 includes a permission packet generator such as a conditional access packet generator 62 and a conditional access management module 64. A conditional access transaction module 66 may also be included within the conditional access system 60. The conditional access transaction module 66 may generate a request for the generation of a conditional access packet by the permission packet generator 62. The conditional access packet may include various types of information, including a request for download or request to open up a connection. The information may also include a time and date for opening the connection. The conditional access packet may also include a request to record a particular satellite broadcast program. The information may include a broadcast program identifier, or a time and date and channel. The conditional access packet is communicated to the head end 12 where it is broadcast to the user devices 22, 26. The transaction module may also post the selection to a customer's account upon selection or watching the content.

The conditional access packet, once received by the user devices 22, 26, may trigger a connection to the website 40, to a second website 70 and/or to a content delivery network 74. Communication between the user device 22 and the website 40 or the content website 70 or the content delivery network 74 may be through the communication network 50 described above.

The content delivery network 74 may be coupled to a content repository 76 having contents received from a content provider 78. The content provider 78 may be various types of content providers, including video, audio, games, data, or the like. The content provider 78 may include a number of different content providers that are used to provide various types of content to the content delivery network 74. The content provider 78 may provide content as requested or at various times to be stored within the content repository 76. The content delivery network 74 and the content repository 76 may be coupled to the head end 12 to provide conventional satellite television service. However, various portions of the content repository 76 may be made available through the content delivery network in response to a request made at the website 40. The contents of the content provider 78 may be provided in various ways including through a fiber optic network, satellite, telephone line, tapes, or DVDs.

Referring back to device 22, the receiving antenna 24 receives signals that may include a modulated multiplexed bit stream from the satellite 18. The receive antenna signals are coupled from a reflector and feed to a low noise block (LNB) 84 which amplifies and frequency-down converts the receive signals. The output of the LNB 84 is provided to a receiver 86 which receives, demodulates, depacketizes, de-multiplexes, decrypts and decodes the receive signal to provide audio and video signals to a display 88. The receive signal may include the CAP signal and a recording request, a request to open a connection, or other control request.

The signals received from the receiver 86 may also be provided to a digital video recorder 90. The digital video recorder 90 may be manifested in a hard drive or in other types of memory devices such as flash memory. The receiver 86 operates in response to a user interface 92 that may include a remote control or push buttons. The push buttons or remote control may be used to make selections on an on-screen display. The user device 22 may also include a control module 94 that is used to control the overall operation of the user device. The control module 22 may include software that initiates content downloading through a connection interface module 96. The connection interface module 96 may communicate to the website 40, the content delivery network 74, or through a content website 70. Some or all of the communications of the connection interface module 96 may be used in an actual embodiment.

A verifier module 98 receives the conditional access packet and sends the instructions to the control module 94 to begin recording or storing content through the connection interface module 96. As mentioned above, some or all of the control module 94, the connection interface module 96, and the verifier module 98 may be implemented in software and/or associated hardware.

Figure 2:
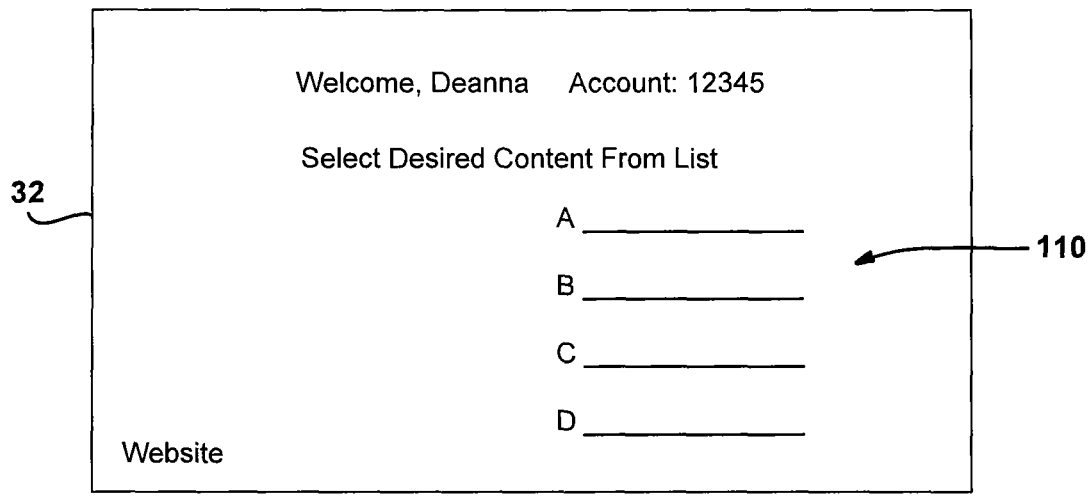
FIG. 2 is a screen display from a website according to the present disclosure.

Referring now to FIG. 2, a display 32 from the computing device 30 is illustrated in further detail illustrating a list of content 110 having items A-E. One or more items from the list 110 may be selected for communicating, downloading, or storing within the DVR 90 of the user device. It should be noted that a mobile device 26 may also include a DVR 90 or other memory for storing various content.

Figure 3:
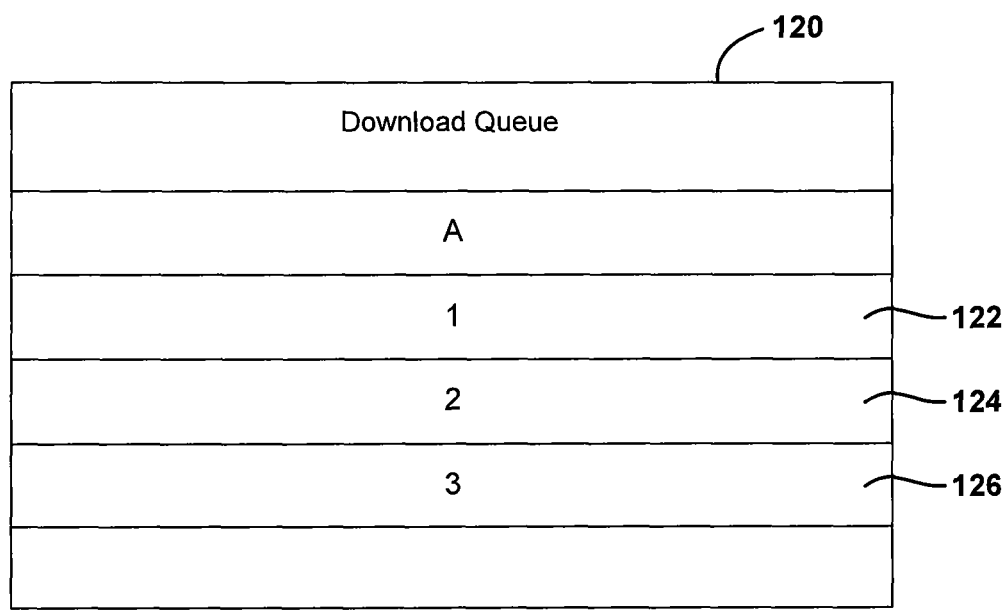
FIG. 3 is a representation of a queue for recording according to the present disclosure.

Referring now to FIG. 3, a download queue 120 is illustrated. The download queue includes a selection from the list 110 of FIG. 2 which is illustrated as capital letter A. Priorities may be selected from the website and, thus, if a high priority is selected, the content A may displace the other queue items 122, 124, and 126. High priority may be automatically set for live broadcast's content or content about to be broadcast.

Figure 4A:
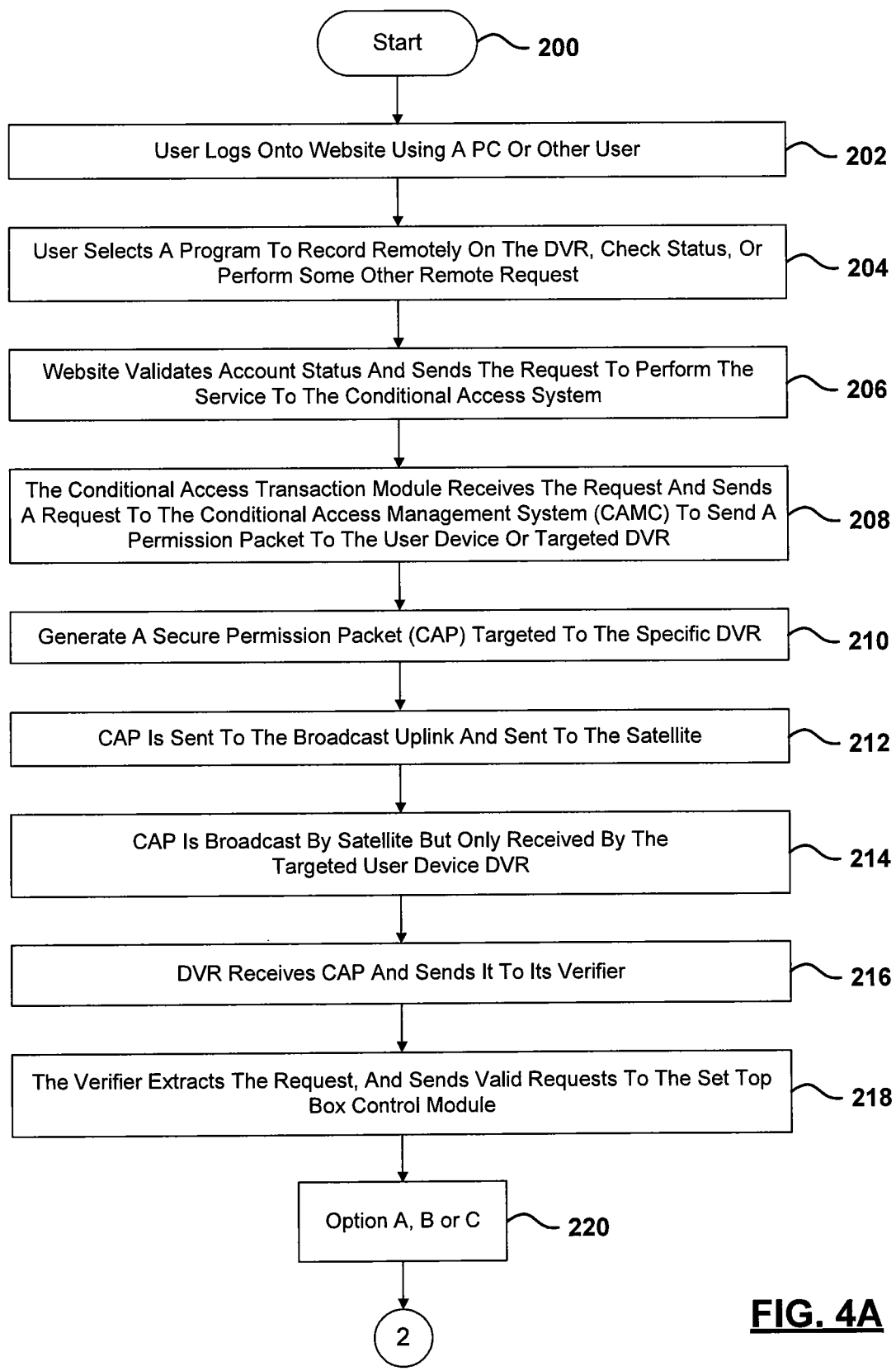
FIGS. 4A and 4B are a flowchart illustrating a method for operating the present disclosure.
Figure 4B:
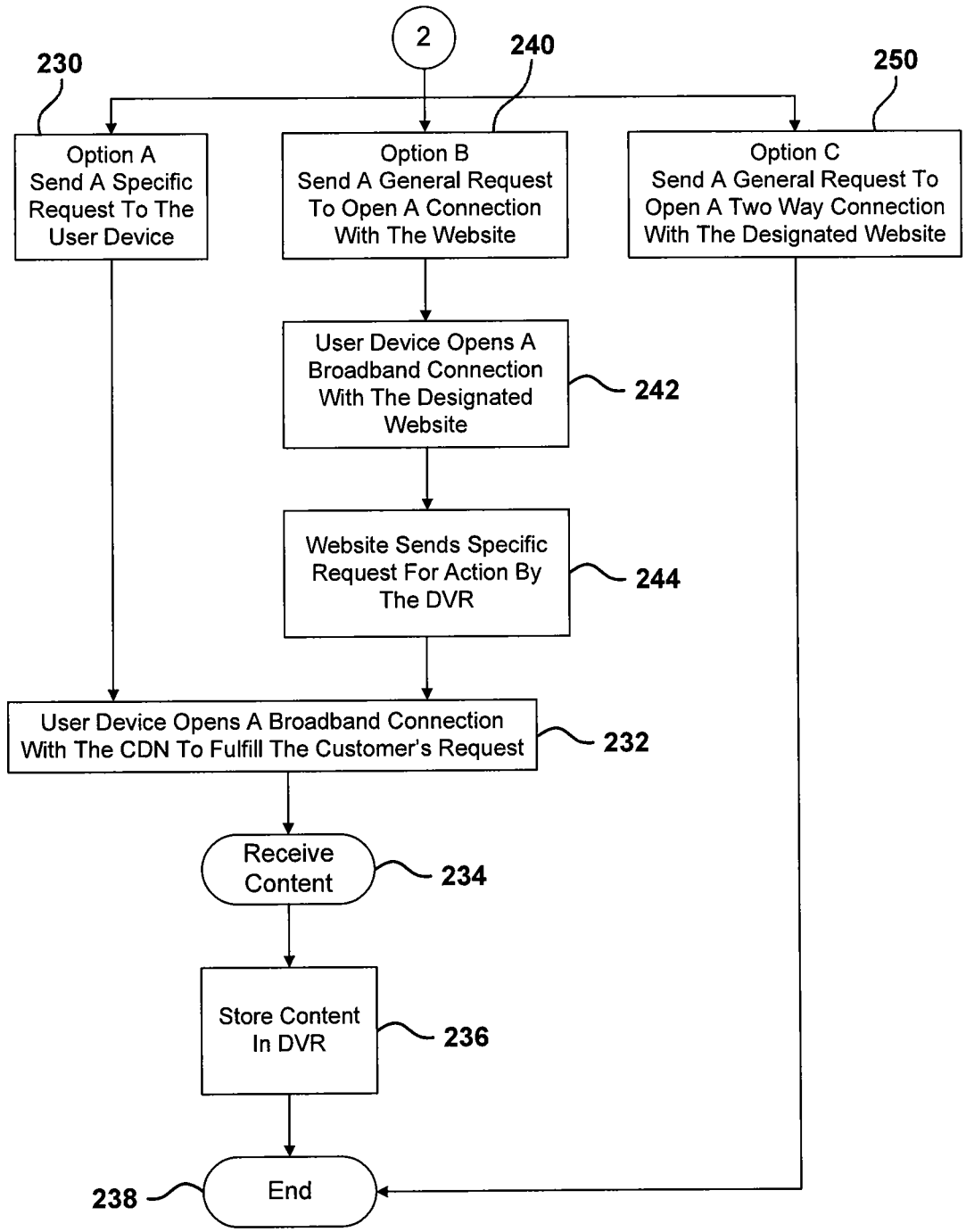

Referring now to FIGS. 4A and 4B, a method for operating the communication system is illustrated. In step 200, the method is started. In step 202, a user logs onto the website 40 using the computing device 30 or other device. In step 204, the user selects a program that is to be recorded remotely on the DVR 90. Also, other remote functions may be selected such as a status check or another type of remote request.

In step 206, the website 40 validates the account status and generates a request to perform the service to the conditional access system 60. In step 208, the conditional access transaction module receives the request and sends the request to the conditional access management module 64 to send a permission packet such as a conditional access packet (CAP) to the user device and, more specifically, to the targeted DVR 90.

In step 210, the conditional access system 60 generates a conditional access packet or permission packet targeted to the specific user device or DVR 90. The conditional access packet may be communicated through the broadcast uplink 16 through the satellite 18 to the DVR or user device. In step 214, the conditional access packet is broadcast by the satellite or other communication device but is only received by the targeted user device or DVR. That is, although the conditional access packet may be seen by other set top boxes in the broadcast area, only the specific DVR will accept the CAP associated with it. As mentioned above, the CAP may include a request to open a connection between the user device and a website, content delivery network, or the like.

In step 216, the user device receives the conditional access packet and sends it to the verifier module 98. The verifier module 98 extracts requests and sends valid requests to the user device control module.

After step 218, step 220 may perform three different options. The three different options may depend on the type of system or upon the type of request. In steps 230 through 238, option A is performed. In step 230, a specific request is sent to the user device for a specific action. In step 232, the user device opens a broadband connection with the content delivery network 74 to fulfill the customer's request for content. The request may include a specific time to open the connection and receive the content. In step 234, the content is received. In step 236, the content is stored in the memory or DVR. In step 238, the system ends. In steps 230 through 236, a connection between the set top box through the connection interface module 96 is established with the content delivery network 74. Communications are communicated through the communication network 50 that may include various types of communication means including an Internet connection, broadband connection, a fiber optic connection, a telephone connection, a wireless or cellular connection, or the like. The connection may be closed when the content is received.

Referring back to step 220, if option B is executed, step 240 is executed. In step 240, a general request to open a connection to the website 40 may be provided. The connection may be triggered by the conditional access packet received by the user device. In step 242, the user device opens a connection with the website 40. This is shown in FIG. 1 by the arrows between the website 40 and the user device 22 through the communication network 50. The website 40 sends a specific request for action by the DVR, step 244. The specific action may include step 232 executed after step 244. Steps 232 through 236 may then be executed in a similar manner to that described above. That is, step 232 may open a broadband connection with the content delivery network that is different than the connection between the user device and the website 40. Content may then be received in step 234 and stored in the DVR in step 236.

Referring back to step 220, in step 220, if option C is executed, a general request to open a two-way connection between the website 40 and the user device 22 through the communication network 50 is performed. The general request is triggered by the conditional access packet received through the satellite. It should be noted that content may be provided from a second content website 70 or through the content repository 76 that is in communication with the website 40. By opening a two-way connection, control of the DVR 90 or other information through the control module 94 of the user device 22 may be provided through the website. This option allows the specific user to directly manage and control the content on the DVR 90. Providing remote access in this manner may be similar to providing direct access at the user device to the DVR 90. For example, through the website, it may be possible to view, delete, initiate recording, or other maintenance functions as if the user was operating the user device directly rather than through a website. Graphical user interfaces, or the like, may be provided on the website to facilitate the control of the memory or DVR 90. After step 250, option C ends in step 238.

As can be seen, security may be provided at different levels throughout the system. For example, a highly secure method may use the satellite to provide the conditional access packet. Of course, other methods for communicating the packet, such as through the communication network, may be implemented. Advantageously, various types of control, including controlling the recording device itself, may be provided by the communication system 10.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of delivering content comprising:
   selecting a content title to form a selected content title;
   generating a permission packet at a conditional access system to allow a user device to open a connection to a content delivery network and obtain content corresponding to the selected content title through the connection from the content delivery network;
   communicating the permission packet from the conditional access system to the user device; and
   at the user device, opening the connection to the content delivery network for communicating content corresponding to the content title to the user device through the content delivery network based on the permission packet.

2. The method as recited in claim 1 further comprising:
   communicating content corresponding to the content title through the connection; and
   storing the content in the user device.

3. The method as recited in claim 2 wherein the user device is a satellite television set top box having a digital video recorder therein.

4. The method as recited in claim 3 wherein storing the content comprises storing the content in the digital video recorder.

5. The method as recited in claim 1 further comprising receiving a content selection at the conditional access system from a computing device.

6. The method as recited in claim 5 further comprising accessing a website by a subscriber using the computing device.

7. The method as recited in claim 1 further comprising accessing a website from a mobile computing device.

8. The method as recited in claim 1 further comprising accessing a website verifying a user prior to selecting a content file.

9. The method as recited in claim 1 wherein generating a permission packet comprises a time and date for opening the connection.

10. The method as recited in claim 1 wherein generating a permission packet comprises a time, date and channel for opening the connection.

11. The method as recited in claim 1 wherein forming a connection comprises forming a two-way connection between the content delivery network and the user device.

12. The method as recited in claim 1 wherein forming a connection comprises forming a two way connection between a second website and the user device.

13. The method as recited in claim 1 wherein communicating the permission packet comprises communicating the permission packet through a satellite.

14. The method as recited in claim 1 wherein the connection is a broadband connection.

15. The method as recited in claim 1 wherein the connection comprises a satellite connection.

16. The method as recited in claim 1 wherein the connection comprises a cable connection.

17. The method as recited in claim 1 wherein the connection comprises a wireless connection.

18. The method as recited in claim 1 wherein the user device comprises a digital video recorder.

19. The method as recited in claim 1 wherein the user device is a satellite television set top box.

20. The method as recited in claim 1 further comprising forming a second connection between the user device and content delivery network, and thereafter communicating a request for action to the user device through the connection and communicating the content through the second connection.

21. The method as recited in claim 1 further comprising adding the content to a queue associated with the user device.

22. The method as recited in claim 21 further comprising assigning a download priority and when the download priority is high, inserting the content in the queue.

23. The method as recited in claim 1 further comprising communicating content through a satellite connection.

24. The method as recited in claim 1 wherein forming a connection to the user device in response to the permission packet comprises tuning and receiving a program from a broadcast satellite system.

25. The method as recited in claim 1 further comprising broadcasting the permission packet to a plurality of user devices and wherein opening comprises opening a connection at a first user device of the plurality of user devices.

26. A system comprising:
    a conditional access system at a head end comprising a processor generating a permission packet in response to a content request corresponding to a content title, said permission packet having information for allowing a user device to open a first connection to a content delivery network so that in response to the permission packet, content corresponding to the content title may be communicated to the user device from the content delivery network through the connection.

27. The system as recited in claim 26 further comprises the content delivery network and the user device wherein said content delivery network communicates the content through the first connection and said user device stores the content in the user device.

28. The system as recited in claim 27 further comprising a website that communicates a request for action to the user device, said user device in response to the request for action forming a second connection to the content delivery network, said content delivery network communicates the content through the second connection, said user device stores the content in the user device.

29. The system as recited in claim 28 wherein the second connection comprises a cable connection.

30. The system as recited in claim 28 wherein the second connection comprises a wireless connection.

31. The system as recited in claim 28 wherein the second connection comprises a broadband connection.

32. The system as recited in claim 28 wherein the user device comprises a digital video recorder.

33. The system as recited in claim 28 wherein the user device comprises a satellite television set top box.

34. The system as recited in claim 26 wherein the first connection comprises a satellite connection.

35. The system as recited in claim 26 wherein the first connection comprises a cable connection.

36. The system as recited in claim 26 wherein the first connection comprises a broadband connection.

37. The system as recited in claim 26 wherein the first connection comprises a wireless connection.

38. The system as recited in claim 26 wherein the permission packet comprises a time and date for forming the first connection.

39. The system as recited in claim 26 wherein the permission packet comprises a time, date and channel for forming the first connection.

* * * * *